United States Patent [19]
Gopal et al.

[11] Patent Number: 6,163,812
[45] Date of Patent: Dec. 19, 2000

[54] ADAPTIVE FAST PATH ARCHITECTURE FOR COMMERCIAL OPERATING SYSTEMS AND INFORMATION SERVER APPLICATIONS

[75] Inventors: Ajei Gopal, Fort Lee, N.J.; Richard Neves, Tarrytown, N.Y.; Suvas Vajracharya, Boulder, Colo.

[73] Assignee: International Business Machines Corporation, Armonk, N.Y.

[21] Appl. No.: 08/954,710

[22] Filed: Oct. 20, 1997

[51] Int. Cl.[7] .................................................. G06F 15/163
[52] U.S. Cl. ............................................................. 709/310
[58] Field of Search ................................... 709/300, 303, 709/305, 235, 310, 330; 710/260; 370/355

[56] References Cited

U.S. PATENT DOCUMENTS

| | | | |
|---|---|---|---|
| 5,210,832 | 5/1993 | Maier et al. | 712/227 |
| 5,561,799 | 10/1996 | Khalidi et al. | 707/200 |
| 5,724,514 | 3/1998 | Arias | 709/235 |
| 5,758,168 | 5/1998 | Mealey et al. | 710/260 |
| 5,808,911 | 9/1998 | Tucker et al. | 709/303 |
| 5,903,559 | 3/1999 | Acharya et al. | 370/355 |

OTHER PUBLICATIONS

"Real–Time Local and Remote Mach IPC: Architecture and Design" Version 1.0 by Franco Travostino et al, Apr. 1994.
Wallach et al., SIGCOMM, Aug., 1996, "ASHs: Application–Specific Handlers for High–Performance Messaging", pp. 1 through 13.
Engler et al., "Exokernel: An Operating System Architecture for Application–Level Resource Management", pp. 1 through 16, 1995.
P. Cao et al., "Implementation and Performance of Integrated Application–Controlled File Caching, Prefetching and Disk Scheduling", Nov., 1994.
C. Pu et al., "Optimistic Incremental Specialization: Streamlining a Commercial Operating System", 1995.
B. Bershad et al., "Extensibility, Safety and Performance in the SPIN Operating System", 1995.
W. Richard Stevens, "UNIX® Network Programming" Prentice Hall PTR, Englewood Cliffs, NJ 07632, pp. 206–212.

*Primary Examiner*—Kenneth R. Coulter
*Attorney, Agent, or Firm*—Wayne L. Ellenbogen

[57] ABSTRACT

A general, event/handler kernel extension system is implemented. Network server extension architecture isolates and exploits the ability to derive responses on the same interrupt the original request was received on using non-paged memory. TCP network server extensions are implemented. A technique is defined for facilitating immediate completion of connection requests using pre-allocated connection endpoints and describes an approach to recycling these connection endpoints. A hybrid HTTP extension implemented partially in user space and partially in kernel space is defined that provides explicit or transparent implementation of the user space component and shared logging between user and kernel space. A technique is defined for prefetching responses to HTTP GET requests using earlier GET responses. Classifying of handler extensions according to latency in deriving a response to a network request is defined. Tight integration with the file system cache is available for sending non-paged responses from the file system cache to the remote client. A complete caching scheme is defined for protocols serving file contents to remote clients.

29 Claims, 8 Drawing Sheets

ADAPTIVE FAST PATH ARCHITECTURE FOR COMMERCIAL OPERATING SYSTEMS AND INFORMATION SERVER APPLICATIONS

FIELD OF THE INVENTION

The present invention relates to operating systems and more particularly to an operating system kernel environment. Specifically, a method and apparatus are described for extending operating system function.

BACKGROUND OF THE INVENTION

Extensibility is found in most modern operating systems, but it is often limited to supporting new devices, not specializing the usage of system resources. One technique exposes operating system policies to applications via event/handler extensions. This is described in B. N. Bershad et al., Extensibility, Safety and Performance in the Operating System, Proceedings of the Fifteenth Symposium on Operating System Principles, 1995. A second technique provides adaptive in-kernel policies that manage resources based on application usage patterns. This is described in C. Pu et al., Optimistic Incremental Specialization: Streamlining a Commercial Operating System, Proceedings of the Fifteenth Symposium on Operating System Principles, 1995; and P. Cao et al., Implementation and Performance of Application-Controlled File Caching, Proceedings of the First Symposium on Operating Systems Design and Implementation (OSDI '94), pp. 165–177, November 1994. A third technique replaces underlying components of the operating system with new components referred to as library operating systems. This is described in D. R. Engler et al., Exokernel: An Operating System Architecture for Application-Level Resource Management, Proceedings of the Fifteenth Symposium on Operating System Principles, 1995.

AIX is an example of an operating system that allows limited extensibility in the form of new device drivers, system calls, and autonomous user-installed kernel processes. Another example, Microsoft's Windows NT, provides the same extension abilities without the ability to add new system calls.

Event/handler extensions refer to the extensibility achieved by allowing applications to install handler code in the kernel. This handler code is triggered by normal operating system events such as processing incoming or outgoing network packets. The ability to install event-triggered handler code in the kernel reduces overhead due to kernel/user interactions such as system calls, memory space copies and maintenance of kernel-supplied user abstractions such as sockets. This is especially useful when several operating system components are used together.

Adaptive operating system mechanisms are useful where the performance of an application might be improved by specializing management of the applications resources dynamically and transparently. An example of this is specializing the open( )/read( )/write( )/close( ) application programmer interfaces (APIs) on the fly such that the implementations are optimized differently for short-lived random accesses than for long lived sequential accesses. Another example of adaptive extensibility is found in file buffer management. Instead of using the same replacement policies for all file buffers, the file buffers for a particular application can be specialized for large, small, sequential, or random access patterns.

Library operating systems are functionally equivalent to event/handler extensibility. The difference between the two extension techniques is a software engineering perspective. Library operating systems provide a "take it or leave it" extensible environment for applications of a certain type while event/handler extensibility provides low level "building block" style extensibility for individual applications or extensions. An example combining the two can be found in D. A. Wallach et al., Application-Specific Handlers for High-Performance Message, Proceedings from the Symposium of Communication Architectures and Protocols (SIGCOMM '96), 1996, where ASHes (Application Specific Handlers) augment the library operating system approach.

SUMMARY OF THE INVENTION

An extension system executes code in response to operating system events and services in a kernel environment. Several handler routines are each executable by respective kernel events. Each handler exports a kernel event and services to an extension architecture situated externally to the kernel environment.

DETAILED DESCRIPTION OF THE INVENTION

The present invention relates to a kernel run-time environment for authoring high performance network servers. One aspect of the present invention relates to an Adaptive Fast Path Architecture (AFPA). AFPA makes it possible for multiple concurrent servers to extend the operating system for high performance. AFPA is designed to allow such extensions to be portable relative to kernel environments where AFPA has been implemented.

Before proceeding, it is useful to define several terms:

Event—This term refers to the execution of discrete code in response to control flow in a software system. The code is typically executed as a result of a hardware state, such as a hardware interrupt. Examples of network kernel events are TCP packet arrival, TCP connection establishment, and TCP disconnection. Network events are initiated by hardware interrupt to the CPU by a network adapter. These hardware interrupts result in TCP protocol events.

Handler—A pointer to discrete code. Handlers are sometimes referred to as callback functions. That is, functions that are specified and called at a later time when desirable. Operating systems often require programmers to implement callback functions. For example, a signal handler executes functions written by a programmer when a signal occurs. In short, a handler is just a piece of code written a priori by a programmer and executed later on when a specific event occurs on behalf of the programmer. For another example, an event may be a network packet arrival. A handler for that event is a function. The handler function would be code that is executed when the event occurs. The handler code would perform whatever steps it is instructed to perform with that packet.

Expose—An event is exposed by defining interfaces desirable for another software system to implement a handler for the event. Exposing the event means providing the interface as desirable for another software system to register the handler to be executed when the event occurs.

Two software systems participate in defining events and handlers: 1) The system exposing the event and 2) the system implementing the handler to be executed when the event occurs.

The present invention relates to an event/handler extension system which is specialized for TCP network server applications. There are three architectures which are desirably used with this system: A network server portability architecture (which provides a specialized portability architecture), a network server extension architecture (which provides a specialized extension architecture), and a network server extension importation mechanism (which provides a specialized extension importation mechanism). A network server extension is also implemented by a programmer to directly interface with programmer written code.

Figure 1:
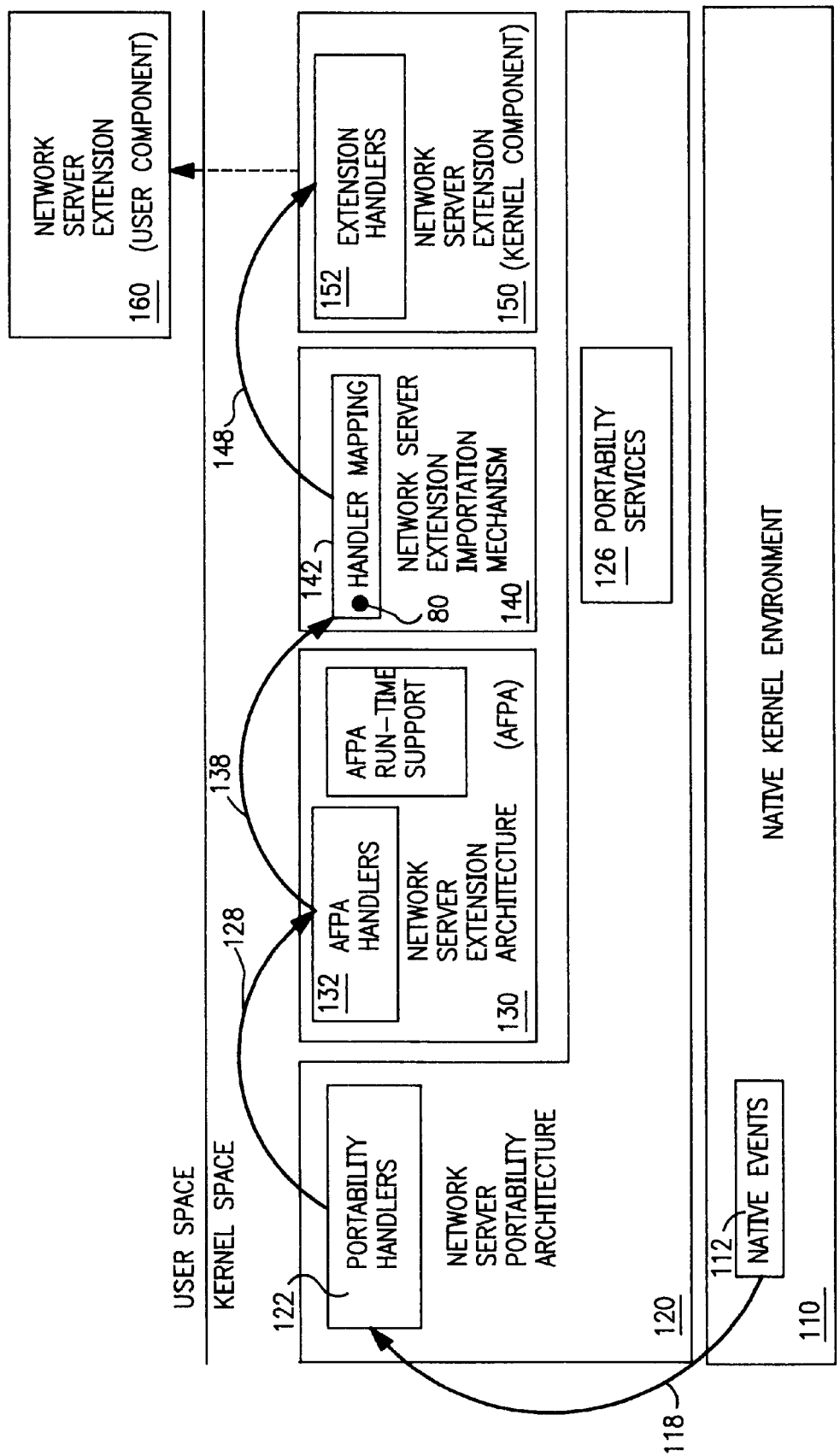
FIG. 1 is a block diagram illustrating the relationship between support modules and extension modules in accordance with an exemplary embodiment of the present invention.

The relationship between the above described support modules and the above described extension module are shown in FIG. 1. As depicted, arrows represent a flow of event occurrence and handler invocation.

As shown in FIG. 1, the native kernel environment of the operating system is identified as item 110. Events which occur in the native kernel environment 110 are identified as native events 112. Native kernel environment 110 includes address space, execution context, security attributes, etc. of an operating system which are typically hidden from the user level applications. The kernel environment implements services exposed to applications in user space. The kernel environment provides services for writing kernel extensions.

The term native is used as a modifier to "kernel environment" to refer to a particular kernel environment. AIX, OS/2, and NT all have distinct native kernel environments. They are distinct because they each have a specific set of application program interfaces (API) for writing subsystems (such as network adapter drivers, video drivers, or kernel extensions).

NT provides hundreds of APIs within its native kernel environment. AIX and OS/2 each have different APIs. Furthermore, the environments among these operating systems differ in how the file system and TCP/IP subsystems interact.

As stated above, native events (e.g., TCP kernel events) 112 are exposed within native kernel environment 110. A plurality of portability handlers 122 (or functions) are called when native events 112 occur. These portability handlers 122 are implemented within the network server portability architecture 120. Portability handlers 122 are defined according to the operating system operating within native kernel environment 110. Thus, portability handlers 122 are operating system dependent.

As previously stated, the arrows in FIG. 1 represent the flow of event occurrence and handler invocation. Thus, native kernel environment 110 exposes native events 112 to the portability handlers 122 within network portability architecture 120. Arc 118 illustrates the event occurrence and handler invocation relationship between native kernel events 112 and portability handlers 122.

As a result of event occurrence and handler invocation 118, native events 112 which were initially exposed within native kernel environment 110 are now exposed by network server portability architecture 120.

Network server extension architecture 130 implements handlers for events which are exposed by network server portability architecture 120. Network server extension architecture 130 includes runtime support which is typically found in network server extensions. Run time support may be, for example, a library of routines providing services. Thus, run time support 134 is included in network server extension architecture 130. The library of routines which are included in run time support unit 134 are described below.

Network server extension architecture 130 includes handlers 132. Portability handlers 122 execute AFPA handlers 132. The execution of AFPA handlers 132 by portability handlers 122 is illustrated by arc 128.

Network server extension importation mechanism 140 implements handlers for events exposed by network server extension architecture 130. Network server extension importation mechanism 140 provides interfaces for registering (creating new event instances and configuring event handling) and deregistering for extensions associated with network server extension architecture 130.

Simply put, network server extension importation mechanism 140 behaves like a table mapping the invocation of extension handlers 152 from AFPA handlers 132. Thus, one of the extension handlers 152 is executed in response to the execution of one of the AFPA handlers 132. In addition, after an extension registers with Network Server Extension Architecture 130 (through the interfaces provided by Network Server Extension Importation Mechanism 140), Network Sever Extension Architecture 130 separates the resource management for that extension from the resource management for other extensions. By separating resource management, handler invocation on behalf of one server extension does not use the resources of another server extension. Separation is made possible by registration. At registration time, a network server extension specifies certain events by specifying the port those events are associated with.

A port is a number. Remote clients send packets to a server. Remote clients specify the port number in the packets they send to a server. A server application "listens" for these packets. When a packet arrives with the port number the server is listening for, the server establishes a connection with the remote client. Sockets are a known means for a server application to use TCP/IP. One socket function is called "listen". One of the parameters for "listen" is the port number. When a server calls listen( ) with a port number, for example port 80, the server is listening for packets associated with port 80 from a remote client. The use of ports is described, for example, in Stevens, W. R., Unix Network Programming, Prentice Hall, 1990.

In an exemplary embodiment of the present invention, an HTTP server registers its handler functions and a TCP/IP port (such as port 80) similarly to the manner in which "listen" specifies a port to listen to. In so doing, events occurring on port 80 cause the invocation of the handler functions specified by the HTTP server and not the handler functions associated with another server extension. Furthermore, resource usage is dictated by the port that triggered the event.

Resource management and allocation for events occurring within Network Server Extension Architecture 130 on port 80 use a context pointer as a reference to the resources associated with port 80 and the server extension which registered port 80. Thus, resources such as memory and connection end points are allocated and used separately on behalf of network server extension 150 by Network Server Extension Architecture 130. These same handler invocation and extension registration capabilities are found in device driver frameworks on modern operating systems. One such example is NT where a device driver framework referred to as the "port"/"miniport" model is used extensively. In this framework, a "port" driver (not to be confused with a network port) allows multiple device drivers called "miniport" drivers to register themselves. Each time a new registration takes place, a new device context is created. On NT, the device context associates resource usage and management with that particular miniport driver. NT provides two port architectures, the specification of which can be adapted to the needs of this invention. The first is the SCSI port architecture. The second is the NDIS port architecture.

Network server extension 150 and network server extension 160 together make a server (e.g., a web server). Network server extension 150 is a kernel component. Network server extension 160 is a user component. The kernel component could be (for example) the "GET" engine of the HTTP protocol. The user component could be "everything else" that is part of the HTTP protocol. It is useful to separate the server extension between kernel and user pieces. This is referred to as a hybrid user/kernel server. The approach allows the extension writer to pick and choose what pieces of the server need to be in user space and what pieces need to be in the kernel.

Operation of network server extension 150 depends on the type of extension (or server or protocol) that is being implemented. Network server extension 150 handlers are called by network server extension architecture 130. Network server extension 150 (i.e. the server extension) gets requests from a remote web browser via these handlers. That is, AFPA handlers 132 invoke the GetCachedResponse provided by network server extension 150. GetCachedResponse checks the contents of response cache 136 in AFPA run-time support 134 to determine if particular responses are cached. For cached responses, Network Server Extension 150 returns the cached response and returns from the call to GetCachedResponse. Based on a return code from GetCachedResponse, AFPA handlers 132 send the response immediately to the remote client. If Network Server Extension 150 is unable to find responses in cache 136, several possibilities exist and are described via a return code when returning from GetCachedResponse. Three exemplary possibilities are described with reference to FIG. 8 as DeriveUncachedResponse, DeriveRemoteResponse, and defer to user space.

A programmer writing a network server extension writes a user space component network server extension 160 and a kernel component network server extension 150. Network server extension 160 executes code requiring a user space process context. Network server extension 150 executes code meant to execute in the context of AFPA handlers 132. An example of this scenario is an HTTP server. In such a server, network server extension 150 manages (for example) HTTP GET requests while deferring HTTP CGI requests to network server extension 160. The programmer designs the server such that performance critical pieces reside in network server extension 150 and less critical pieces requiring user space process protection reside in network server extension 160.

As an example, a programmer writing an HTTP server kernel component servicing GET requests may implement the logic for handling such requests in extension handlers 152. Extension handlers are registered with the extension importation mechanism 140. Thus, extension handlers 152 are mapped to AFPA Handlers 132 such that the extension handlers are executed when the AFPA handlers are executed. Arcs 138 and 148 illustrate the mapping between AFPA handlers and extension handlers.

In an exemplary embodiment of the present invention, HTTP GET requests may be prefeteched while deriving responses to a previous HTTP GET request. This is accomplished as follows. A remote client sends an HTTP GET request to the server implemented by Network Server Extension 150, 160. When a request is received that is not in the response cache 136, GetUncachedResponse 152 is called by AFPA handlers 132 since GetCachedResponse failed in finding the response in the response cache 136. Thus, a cache miss has occurred. For the HTTP GET protocol, responses consist of files (e.g. image files) that must be read out of the file system and placed in the cache 136. It is conceivable to search for embedded requests in a given response each time a response is sent to the remote client. This, however, may incur a great deal of overhead in searching a response byte by byte each time a response is sent out. This overhead may be avoided by searching for embedded requests when the response is first loaded into the cache. Thus, on a cache miss, an HTML response file is read from the file system and searched for directives indicating an embedded requests once. These future requests are described in the HTML (hypertext markup language) standard as special tags specifying files such as image files. The remote browser is expected to make these requests soon after receiving the initial response (which was just searched). In anticipation of these requests, references to the requests are placed in the cache entry associated with the original response. Thus, when any future browser requests this same response, some or all of the embedded requests are readily available in the cache. When this happens, some or all of the future requests are loaded into the cache if they have not been already. This technique may shorten the time to deliver a web page with several embedded requests.

Figure 2:
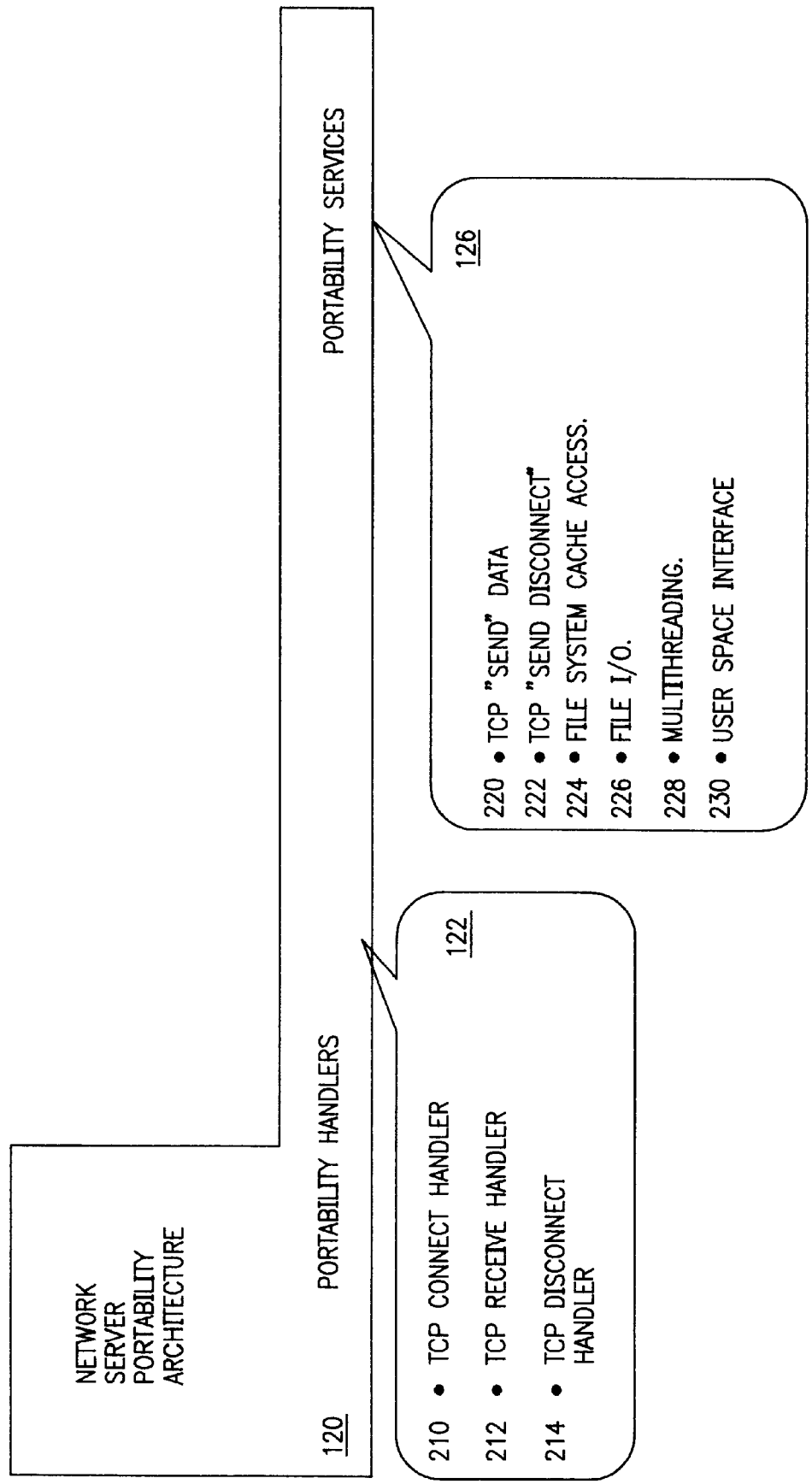
FIG. 2 is a block diagram which illustrates network server portability architecture in accordance with an exemplary embodiment of the present invention.

Network server portability architecture 120 is described with reference to FIG. 2. Examples of portability handlers 122 and portability services 126 are given. The portability handlers provided in the network server portability architecture are the TCP connect handler 210, TCP receive handler 212, and the TCP disconnect handler 214. TCP connect handler 210 is executed when TCP connections are established with a remote client. TCP receive handler 212 is executed when TCP packets arrive from a remote client. TCP disconnect handler 214 is executed when TCP disconnect requests arrive from a remote client. Windows NT provides a means to execute such handlers. The Windows NT native kernel environment provides events 112 that map directly to the portability handlers 210, 212, 214. Windows NT defines these kernel events as transport driver interface (TDI). The portability handlers may be defined to work with TDI.

Network server portability architecture 120 also provides network services required by the other kernel software modules. These services include the TCP service for sending data 220, the TCP service for initiating a TCP disconnect 222, file system services for modifying the cache and performing file I/O (224 and 226, respectively), multithreading services 228, and user space interface creation 230. Each of these services are standard native kernel environment services in most modem kernel environments. Network server portability architecture 120 provides a common wrapper for these services such that Network Server Extension Architecture 130, Network Server Extension Importation Mechanism 140, and Network Server Extension 150 can be implemented across platforms using the same code. Windows NT contains hundreds of such services, only some of which are useful for implementing network servers. The network server portability architecture 122 implements wrappers for portability services 126 since these are most commonly needed for network servers. The network server portability architecture does not wrap every native kernel environment interface.

Figure 3:
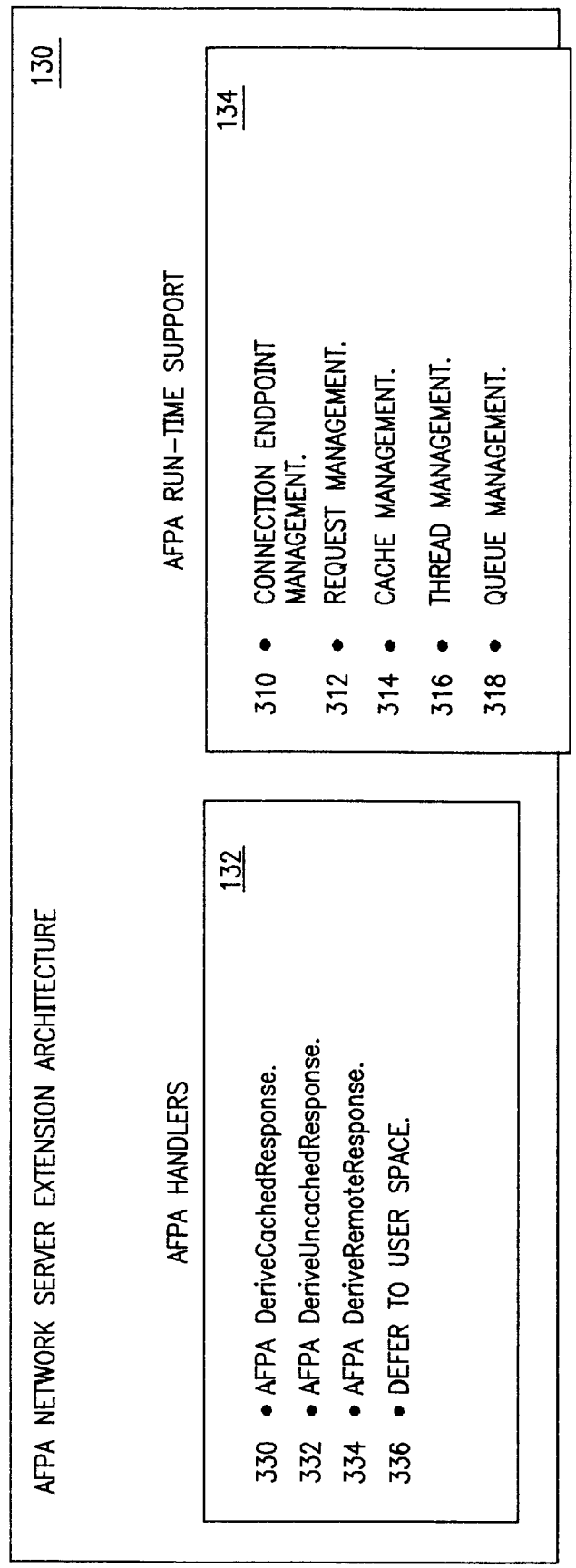
FIG. 3 is a block diagram which illustrates network server extension architecture in accordance with an exemplary embodiment of the present invention.

Network server extension architecture 130 is described with reference to FIG. 3. In an exemplary embodiment of the present invention, network server extension architecture 130 is referred to as the adaptive fast path architecture 130 or AFPA 130. AFPA 130 has two components: AFPA handlers 132 and AFPA run-time support 134. AFPA 130 provides four handlers for executing server extension code. These four handlers are DeriveCachedResponse 330, DeriveUncachedResponse 332, DeriveRemoteResponse 334, and deferral 336 to the user space component of kernel extension 160. These four functions are a callback interface for authoring network servers as a kernel component 150. These functions are now described in the context of writing (i.e. TCP) network server extensions 150/160.

DeriveCachedResponse 330 is called by an AFPA handler 132 via the handler mapping 142 and is passed via parameters the unprocessed data from the TCP stack. Thus, DeriveCachedResponse is called when a TCP packet arrives from the remote host. The programmer implements DeriveCachedResponse to parse this packet and extract a request from it. The parsed request is referred to as the request ID and is used to look up a response in cache 136. For example, a request ID for an HTTP request would be a file name. DeriveCachedResponse uses the request ID to look up the response (file) in the cache 136. If the response is in the cache, DeriveCachedResponse indicates this via a return code. The caller (an AFPA handler in 132) sends the response to the remote client as instructed by the return code from DeriveCachedResponse. In addition to parsing raw request data and determining if a response is cached, DeriveCachedResponse uses the raw packet it is passed to determine if enough data has been sent to constitute a complete request.

If the response is not in cache 136, DeriveCachedResponse indicates one of three possible actions that are to be taken by the caller (an AFPA handler in 132). Again, these actions are specified via a return code from DeriveCachedResponse. Three possible actions are: 1) Execute DeriveUncachedResponse 332, 2) Execute DeriveRemoteResponse 334, and 3) defer 336 to user space component 160.

If execute DeriveUncachedResponse 332, is specified by DeriveCachedResponse the extension's DeriveUncachedResponse function is called and passed the request. DeriveCachedResponse does not call DeriveUncachedResponse directly because DeriveCachedResponse is typically in a restricted interrupt context. On Windows NT DeriveCachedResponse executes at "dispatch" level. Because file I/O cannot occur at "dispatch" level on NT, it is necessary to derive file responses at a different interrupt level. Separating the call to DeriveCachedResponse from the call to DeriveUncachedResponse permits the AFPA runtime to queue the request such that threads in a different interrupt level can execute DeriveUncachedResponse. These same interrupt requirements can be found on UNIX operating systems as well. This control flow is illustrated in item 850 (discussed below). Once executed, DeriveUncachedResponse performs the necessary I/O to derive a response. For an HTTP server, this means opening a file handle, updating the cache 136, and returning to the caller indicating that the newly derived response should be sent to the remote client. Thus, the response is now in cache 136 and may be serviced by DeriveCachedResponse without calling DerivingUncached response in the future.

If execute DeriveRemoteResponse 334, is specified by DeriveCachedResponse, the extension's DeriveRemoteResponse function is called and passed the request by an AFPA handler 132. DeriveRemoteResponse is called when responses are only possible using network communication. DeriveRemoteResponse is an example of an additional callback that might be useful for implementing different types of servers. An example of where DeriveRemoteResponse is useful is in the context of HTTP proxy servers. In such servers, requests must be forwarded to another server and the response and forwarded back to the remote client. DeriveRemoteResponse returns a response obtained from network communication back to the caller (AFPA 132).

If defer to user space 336 is specified by DeriveCachedResponse, the extensions user space component is given the request for processing. This is accomplished by producing the request to a standard FIFO queue that is consumed by the user space component via custom kernel interfaces. These custom interfaces are conventional interfaces that request data from a shared queue in the kernel environment. On AIX, such interfaces are actual system calls that are added to the operating system. On NT, such interfaces are IOCTL interfaces to an AFPA driver extension. Once the user space component has derived a response using whatever means are convenient, the response is sent via custom kernel interfaces. These custom interfaces are conventional interfaces that pass data to a kernel component (in this case AFPA).

The above discussion describes four possible handler interfaces to a server extension implemented in 150. One of ordinary skill will recognize that there are interfaces that are variations of these and input and output to these interfaces that differs from the discussion above. In many cases, native kernel events are augmented by application specific code. One of ordinary skill will also recognize that there are variations on the types of responses stored in the AFPA cache.

In an alternative embodiment of the present invention, cache 136 could contain much more than file handles or file data. For example, HTTP responses consist of multiple types of header data and a file. It is conceivable that the cached response is a combination of file and meta data such as this. AFPA 130 implements run-time support 134 for a number of items. These items are connection management 310, request management 312, cache management 314, thread management 316, and queue management 318. Connection management is discussed with reference to FIG. 5. Request management is discussed with reference to FIG. 6. Cache management is discussed with reference to FIG. 7. Queue management means providing an logical queue abstraction with interfaces and multiprocessor safe modification. Unless otherwise specified, queues in this invention are FIFO (first in first out) and are conventional. Thread management means creating and destroying threads. Thread management also means consuming resources from queues without race conditions. Thread management may be implemented in accordance with conventional techniques.

Connection, requests, and messages are now defined. Connections are data structures defined by the native kernel environment 110, but allocated and deallocated via AFPA run-time support 134. An example of a connection is a TCP connection endpoint created on the server for tracking connections made on a unique address/port pair.

A request has four components: connection, request data, request ID, and send data. A server handling multiple requests over the same connection (such as FTP) generates requests with the same connection. A server handling one request per connection (such as HTTP) has a unique connection for each request.

Request data is a linked list of non-paged memory fragments referred to as messages. The linked list data structure is used to allow multiple messages to be associated with a single request. This is necessary for client/server protocols where the request data size exceeds the maximum transfer unit (MTU) of the underlying network.

Figure 8:
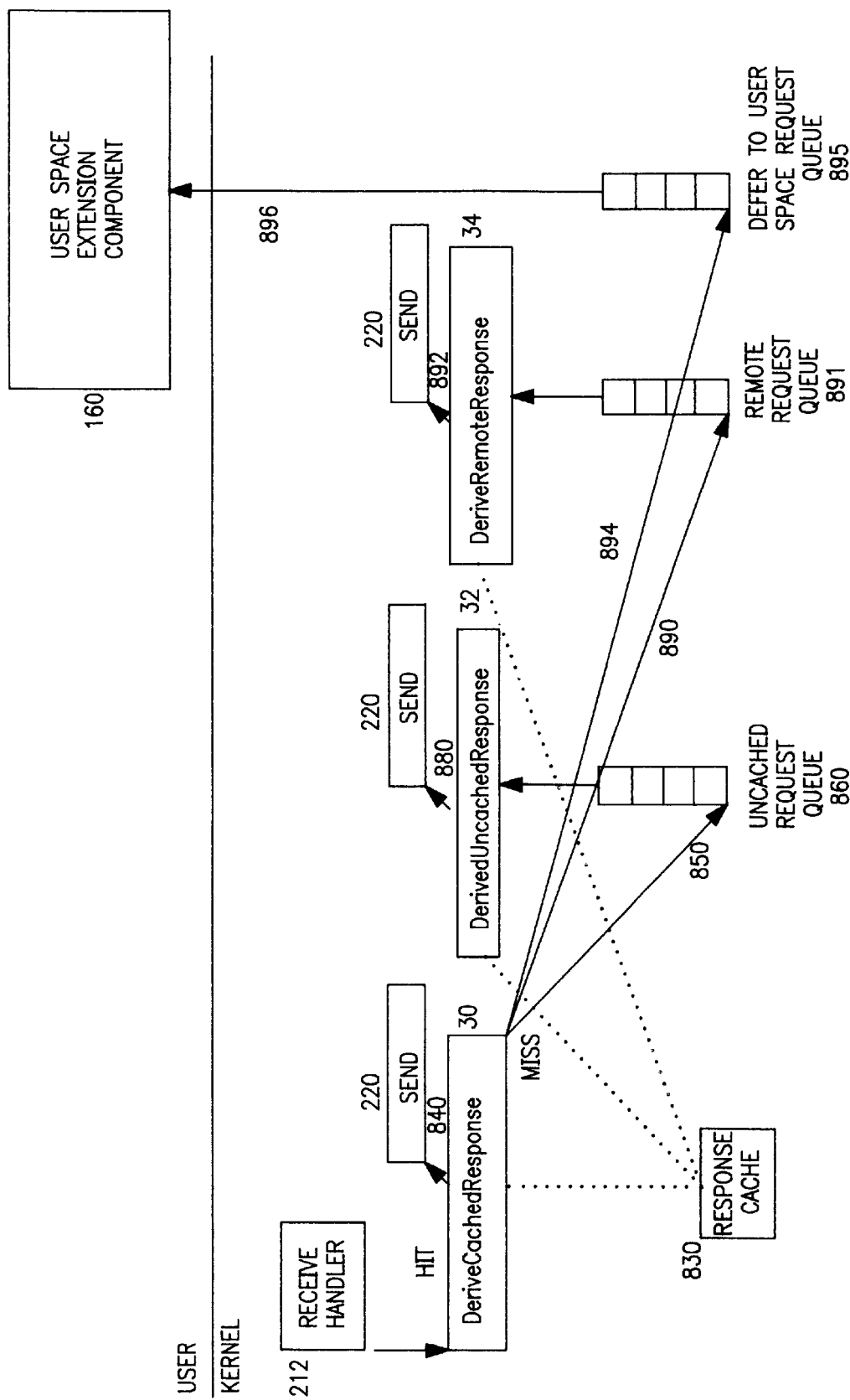
FIG. 8 is a block diagram which illustrates control flow scenarios for requesting routing in accordance with an exemplary embodiment of the present invention.

Network server extension 150 provides a reproducible request ID for every request data in every request. The request ID is used to associate responses in the response cache with newly arrived request data. For HTTP server extensions, a request ID may be a file name. This request ID is derived from the request sent by the remote client (such as an HTTP GET request). In FIG. 8, a request ID is produced to one of three queues depending on the action specified by DeriveCachedResponse on a cache miss. In all three cases (850, 890, 894), the request ID is produced to a queue that is consumed by one or more threads executing DeriveUncachedResponse, DeriveRemoteResponse, or in the user space component.

The send data is the non-cacheable data associated with a request that is desirably included in the corresponding response. Since such data cannot be cached (since it changes for each response), it is necessary to associate this data with each request. For example, HTTP GET responses require data specific to the original HTTP request and the contents of a particular file. For example, a date stamp is required for such responses. The later is cacheable while the former is not. To preserve the non-cacheable data that must be sent with the response, individual requests contain this"send data".

Figure 4:
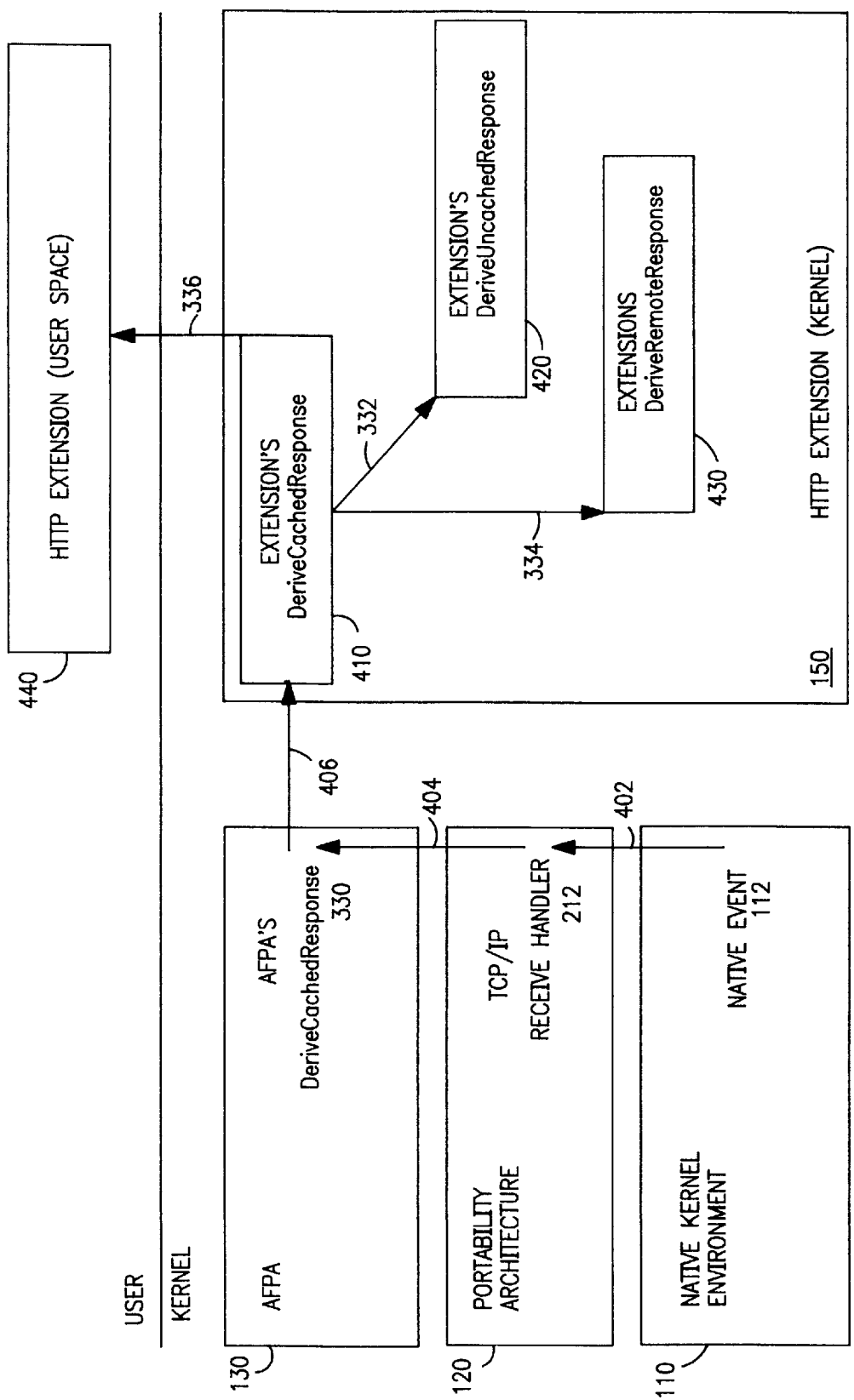
FIG. 4 is a block diagram which illustrates control flow of a remote client request in accordance with an exemplary embodiment of the present invention.

FIG. 4 illustrates an example the control flow of a remote client request in the AFPA 130 for an HTTP extension 150. Control flow begins in native kernel environment 110 when a native kernel event 112 occurs indicating the arrival of TCP data. The portability architecture 120 provides a TCP/IP receive handler 212 which is executed in response to the native kernel event. As a result of the portability architecture executing its TCP/IP receive handler, DeriveCachedResponse handler 330 in AFPA 130 is executed.

A priori to the above events, HTTP kernel component extension 150 has registered each of its handlers with AFPA 130. Registration with AFPA 130 means AFPA 130 is configured to execute handlers within kernel extension component 150 when the corresponding handlers are executed by AFPA 130. For example, DeriveCachedResponse 330 executes DeriveCachedResponse 410 within kernel component extension 150. Registration with AFPA 130 also means a port has been specified by the kernel extension component 150.

After data from the remote client arrives, DeriveCachedResponse 410 within extension 150 parses the incoming HTTP request and checks the AFPA cache for the desired response. Three exemplary outcomes 332, 334, 336 are possible resulting in three exemplary extension handlers 420, 430, and 436 being executed. This is described in more detail with reference to FIG. 8.

Figure 5:
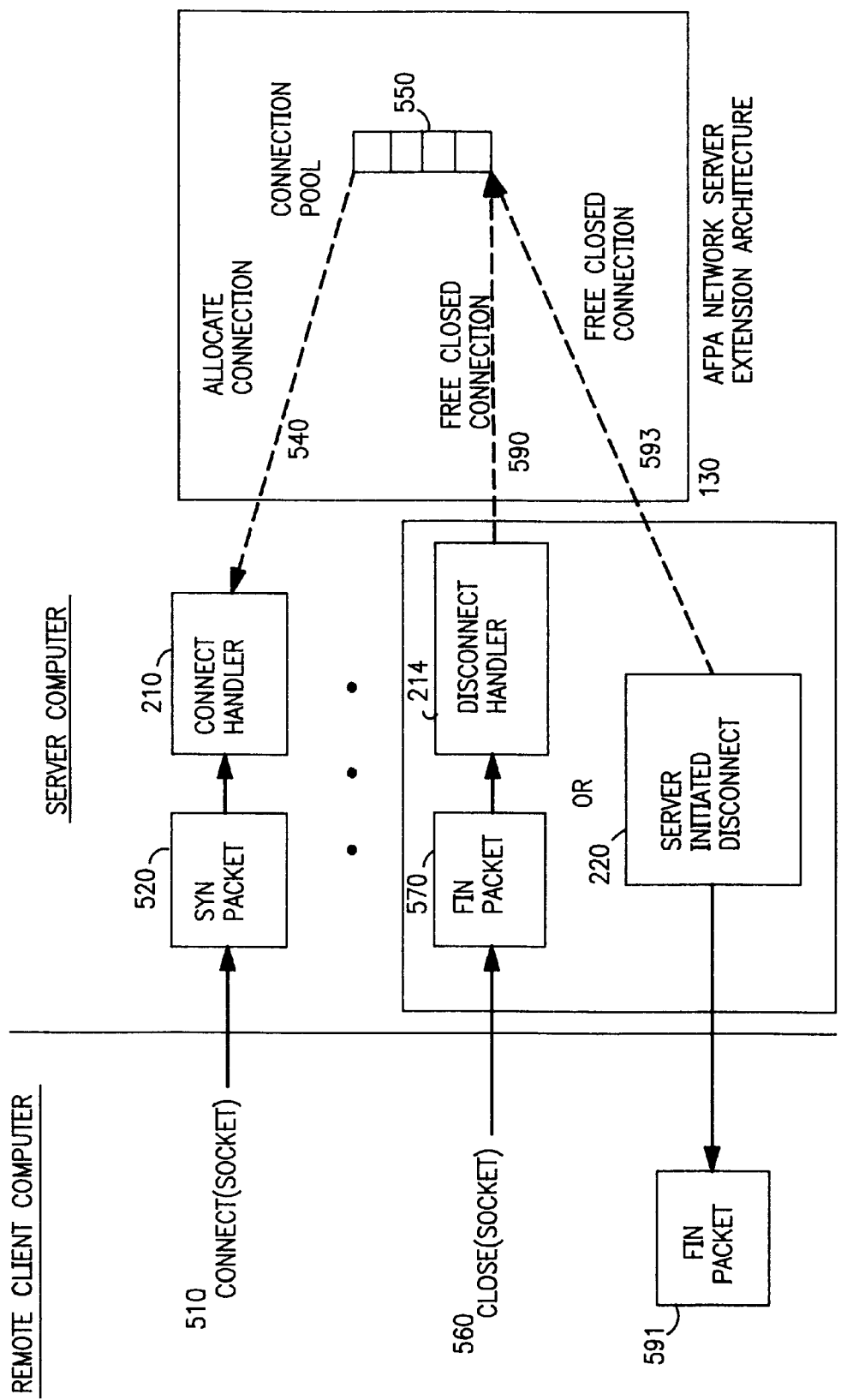
FIG. 5 is a block diagram which illustrates connection management for TCP/IP.

FIG. 5 is an illustration of connection management for TCP/IP. The remote client portion of the figure shows the actions occurring from the perspective of the remote client computer. Likewise, the server side shows the actions from the perspective of an exemplary embodiment of the present invention.

AFPA 130 maintains a pool of unused connection data structures in connection pool 550. As connections are established, their data structures are allocated from connection pool 550. As disconnections occur, connection data structures are returned to connection pool 550. This reduces the computation necessary to establish connections.

When the remote client issues a connect request 510, the server computer receives a TCP/IP SYN packet 520. This triggers a native kernel event that executes connect handler 210. Connect handler 210 executes connection management code within AFPA 134. This may include, for example, connection management code 540, 590, and 593. Upon receiving the TCP/IP SYN packet, the server computer allocates a new connection 540 from the connection pool 550. On Windows NT a connection is referred to as a connection endpoint On UNIX operating systems, a connection is typically referred to as a socket. In a preferred embodiment of the present invention listen and socket queues are excluded. When a SYN packet arrives it is immediately allocated a connection 540 instead of being queued. Completing a TCP connection may be indicated by the arrival of a TCP SYN packet. This may be accomplished by sending a TCP SYN\ACK packet at the same time an interrupt or received for the TCP SYN packet.

A connection is destroyed one of two ways: 1) The remote client closes the connection FIN packet 570 and disconnect handler 214. 2) The server initiates a disconnect 593 and 220. In either case, the connection is returned to the connection pool 590 or 593 for use in establishing a new connection 540.

Figure 6:
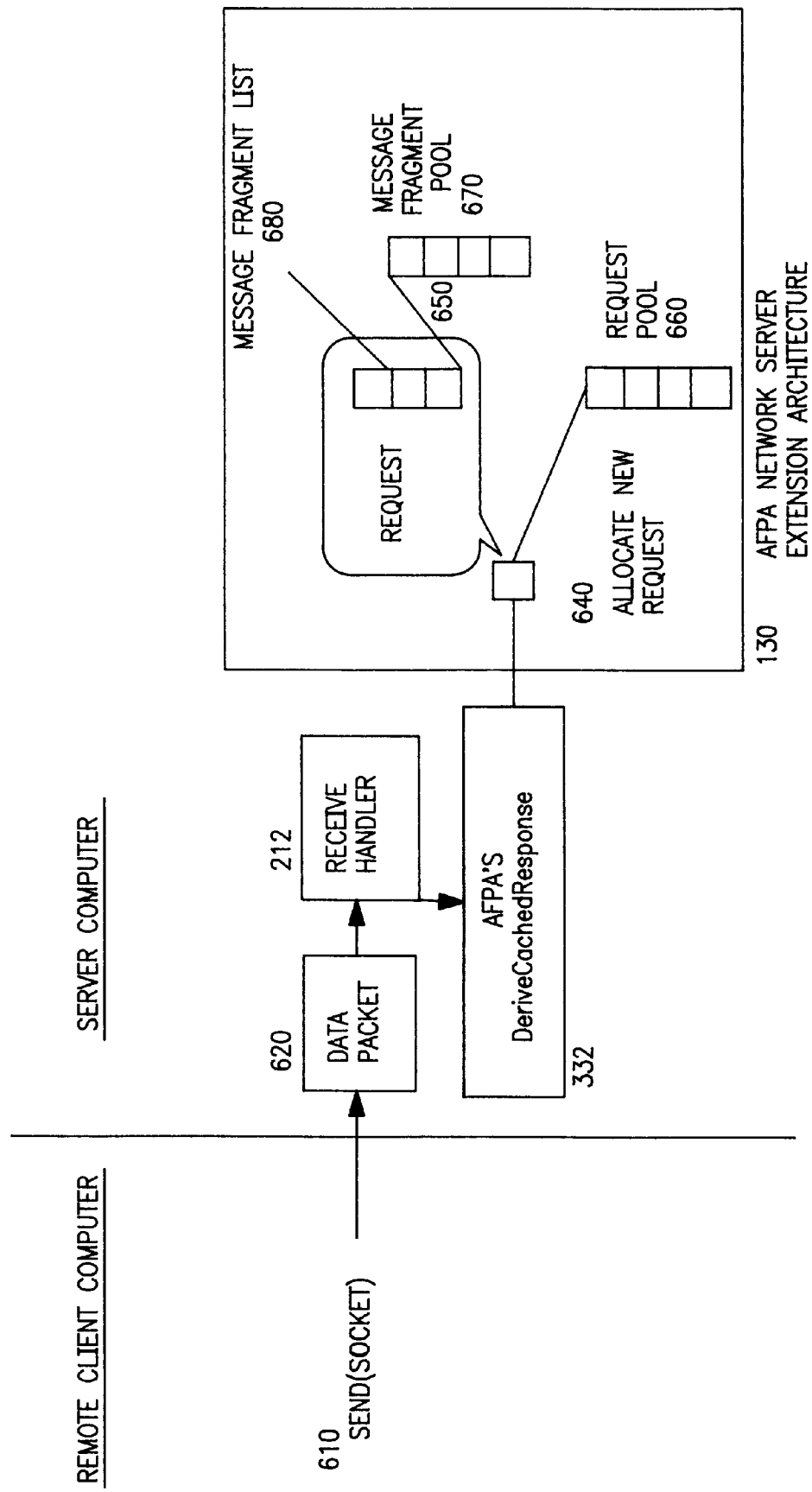
FIG. 6 is a block diagram which illustrates request management for TCP.

FIG. 6 illustrates an example of request management for TCP. The remote client portion of the figure shows the actions occurring from the perspective of the remote client. Likewise, the server side shows the actions from the perspective of the invention embodiment (network server extension system).

When a receive event occurs 610, a data packet 620 arrives. Receive handler 212 is executed which in turn executes DeriveCachedResponse 332 of AFPA 130. DeriveCachedResponse 332 parses the request, determining if it is complete. To accommodate the newly arrived data, AFPA 130 removes a request data structure 640 from a pool of preallocated request data structures 660. AFPA 130 also preallocates message fragments from the message pool 670. For each new data packet, a new message fragment is allocated from the message fragment pool and placed on the message fragment list 680 which is part of the request data structure 640. DeriveCachedResponse 332 then copies the newly arrived data into the message fragment. When enough data has arrived on the connection to constitute a full request, DeriveCachedResponse 332 parses the request and queries the cache for the response.

An exemplary embodiment of the present invention addresses network servers relying on the file system for deriving responses. Such servers typically require integration with the native kernel environment's cache. The distinction between such servers is made when the network server extension registers with network extension importation mechanisms.

Figure 7:
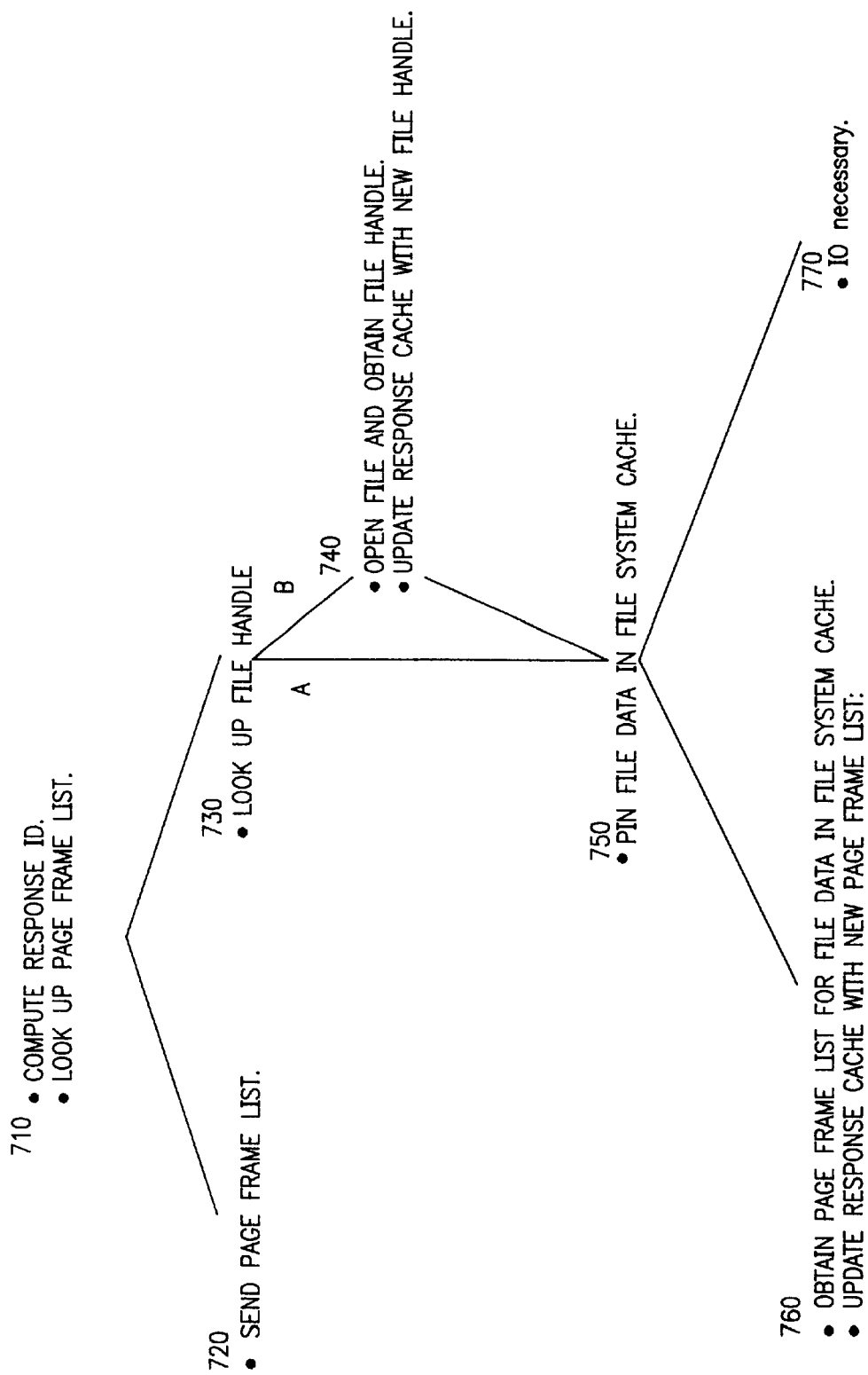
FIG. 7 is a graphical diagram which illustrates control paths relating to cache management for file oriented network servers.

DeriveCachedResponse and DeriveUncachedResponse in FIG. 4 query and update cache 136 in performing the above described actions. For file oriented servers these queries and updates result in additional queries and updates to the file system cache. FIG. 7 shows the control flow for obtaining file system data to derive a response to a client request.

FIG. 7 demonstrates 5 different control paths in deriving a response using data from the file system and a response cache entry. This example assumes file I/O must be handled on a different thread than the handler for the network receive event because such a handler executes in a restrictive interrupt level. This example assumes (for clarity not necessity) that every request ID has a response cache entry in the AFPA response cache 136. A response cache entry can be created and paths 730, 740, 750, 770 executed as desirable. This example also assumes that the file system cache is backed by pageable memory (as on Windows NT or AIX operating systems). Lastly, the example assumes that file data can be pinned and unpinned in one action. For large files this may not be possible.

Handling file I/O on a different thread is desirable in three cases: 1) The file has not been read yet (and is not in the file system cache). 2) The file has been read, but is only partially cached. 3) The file has been read and is in the cache, but requires a page fault before the data is in paged in. The 5 control paths are now described:

The DeriveCachedResponse routine computes the request ID and queries the response cache. The response cache entry is found. DeriveCachedResponse returns the response cache entry to the caller (AFPA 132). The caller (AFPA 132) finds the pinned page frame list for the response and sends it immediately using the portability services 126. This is the best case and yields maximum performance since the response is derived immediately upon receiving the request using non-pageable memory on the same interrupt the receive event occurred on.

DeriveCachedResponse computes the request ID and queries response cache 136 for the response cache entry. The response cache entry is found. DeriveCachedResponse returns the response cache entry to the caller (AFPA 132). The caller (AFPA 132) does not find a pinned page frame list in the response cache entry. The caller (AFPA 132) switches to a less restrictive interrupt level where file I/O is possible. The caller (AFPA 132) finds the file handle in the response cache entry. The caller (AFPA 132) attempts to pin the file's data in the file system cache. Pinning file data is successful. The caller (AFPA 132) obtains the page frame list for file data in the file system cache. Another response entry's pinned page frame list is unpinned and freed. This response entry is updated with the pinned page frame list.

In accordance with the description above, AFPA caches references to file data and lets the native file system cache perform its prescribed job of caching file contents. By avoiding the double buffering of two caches, greater efficiency is realized.

DeriveCachedResponse computes the request ID and queries the response cache for the response cache entry. The response cache entry is found. DeriveCachedResponse returns the response cache entry to the caller (AFPA 132). The caller (AFPA 132) does not find a pinned page frame list in the response cache entry. The caller (AFPA 132) switches to a less restrictive interrupt level where file I/O is possible. The caller (AFPA 132) finds the file handle in the response cache entry. The caller (AFPA 132) attempts to pin the file's data in the file system cache. Pinning file data is not successful because the file was only partially cached in the file system cache. The caller (AFPA 132) performs necessary file I/O to load contents of file into file system cache. Another attempt is made to pin the file data and is successful. Another response entry's pinned page frame list is unpinned and freed. This response entry is updated with the newly pinned page frame list.

DeriveCachedResponse computes the request ID and queries the response cache for the response cache entry. The response cache entry is found. DeriveCachedResponse returns the response cache entry to the caller (AFPA 132). The caller (AFPA 132) does not find a pinned page frame list in the response cache entry. The caller (AFPA 132) switches to a less restrictive interrupt level where file I/O is possible. The caller (AFPA 132) does not find the file handle in the response cache entry. The caller (AFPA 132) obtains a file handle by opening the file. Another response cache entry's file handle is invalidated. This response cache entry is updated with the new file handle. The caller (AFPA 132) attempts to pin the file's data in the file system cache. Pinning file data is successful. The caller (AFPA 132) obtains the page frame list for file data in the file system cache. Another response entry's pinned page frame list is unpinned and freed. This response entry is updated with the pinned page frame list.

DeriveCachedResponse computes the request ID and queries the response cache for the response cache entry. The response cache entry is found. DeriveCachedResponse returns the response cache entry to the caller (AFPA 132). The caller (AFPA 132) does not find a pinned page frame list in the response cache entry. The caller (AFPA 132) switches to a less restrictive interrupt level where file I/O is possible. The caller (AFPA 132) does not find the file handle in the response cache entry. The caller (AFPA 132) obtains a file handle by opening the file. Another response cache entry's file handle is invalidated. This response cache entry is updated with the new file handle. The caller (AFPA 132) attempts to pin the file's data in the file system cache. Pinning file data is not successful because the file was only partially cached in the file system cache. The caller (AFPA 132) performs necessary file I/O to load contents of file into file system cache. Another attempt is made to pin the file data and is successful. Another response entry's pinned page frame list is unpinned and freed. This response entry is updated with the newly pinned page frame list.

FIG. 8 illustrates the possible control flow scenarios for request routing using the AFPA network extension architecture. AFPA provides four handlers for executing server extension code. These four handlers are DeriveCachedResponse 330, DeriveUncachedResponse 332, DeriveRemoteResponse 334, and deferral to the user space component 160 of kernel extension.

FIG. 8 shows possible routes a request can take in executing AFPA handlers when cache misses and cache hits occur. Receive handler 212 triggers DeriveCachedResponse to be executed repeatedly until the entire request has been received. This is illustrated in FIG. 6. If DeriveCachedResponse determines the response is in the response cache, this is considered a cache hit 840 and the portability layer's TCP/IP send service 220 is used to send the response to the remote client directly from the cache.

DeriveCachedResponse executes at the same restrictive interrupt level that TCP processing for that request was executed on. When the response is in cache and stored in non-pageable (i.e. pinned) memory, AFPA achieves optimal performance.

However, any responses requiring file I/O must be deferred to later processing in the context chosen by AFPA for DeriveUncachedResponse 880. This context might be a kernel thread running at a less restructure interrupt level. Refer to FIG. 7 to determine whether the cache hit handler can complete without file I/O. Any control flow in FIG. 7 requiring the execution of item 770 will require file I/O. In these cases, a less restrictive interrupt level is desirable. When a response cache entry cannot be found, the AFPA caller 134 is unable to deliver a response. In these cases, the cache query is a miss (850 or 890 in FIG. 8) and the request is queued to one of the remaining three AFPA handlers 860, 891.

The DeriveUncachedResponse miss case 880 attempts to retrieve the file via file I/O. The DeriveRemoteResponse 892 miss case is given control when the response must be derived via additional network communication.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. In a operating system kernel environment, an event/handler extension system for executing application code for a specific class of applications in response to operating system kernel events and services, said system comprising:
    a) an extension importation mechanism for specifying handler routines on behalf of one or more classes of applications, wherein said handler routines execute in a kernel environment, in response to said kernel events;
    b) one or more class specific extension architectures, coupled to said importation mechanism, for mapping supplied handler routines to said kernel events and implementing class specific functionality necessary in executing said handler routines in response to said discrete operating system kernel events; and
    c) one or more operating system dependent portability architectures, coupled to said kernel environment, for exporting said kernel events and said services to said one or more extension architectures, wherein said one or more portability architectures separate each extension architecture from said kernel environment.

2. The system of claim 1 wherein a class specific application code is a network server kernel extension.

3. The system of claim 2 wherein said network server kernel extension derives responses from non-pageable memory on a same interrupt or thread of execution as the processing required to receive the original request.

4. The system of claim 2 wherein said network server kernel extension uses the TCP/IP transport protocol.

5. The system of claim 4 where completing a TCP connection as indicated by the arrival of a TCP SYN packet is accomplished by sending a TCP SYN/ACK packet on a same interrupt or thread of execution as the processing required to receive the said TCP SYN packet.

6. The system of claim 4 wherein said network server extension implements the HTTP protocol.

7. The system of claim 6 where the GET portion of the HTTP protocol is implemented as said handler routines executed in response to said kernel events.

8. The system of claim 7 wherein future HTTP GET responses are prefetched while deriving responses to a previous HTTP GET requests.

9. The system of claim 1, wherein said one or more domain specific applications are implemented partially in user space and partially in said kernel environment as said supplied handler routines.

10. The system of claim 9 wherein said domain specific application is a network server application.

11. The system of claim 10 wherein the user space application component obtains TCP/IP delivered requests and TCP/IP delivered responses using standard TCP/IP socket interfaces, said user space application is not modified to operate in conjunction with class specific architecture component.

12. The system in claim 10 wherein said extension architecture is a network server extension architecture and wherein the user space application component receives TCP/IP delivered client requests explicitly using a user request queue and sends server responses using response services (add to fig/spec), said user request queue couples the user space application component and the network server extension architecture, said user request queue comprising:
    a) a producer/consumer queue wherein a producer is the network server extension architecture and a consumer is a user space application component, said network server extension architecture adapted to receive request data fragments and produce said data fragments as a single request to said producer/consumer queue; and
    b) request services for the user space application component to consume said client requests from the request queue.

13. The system of claim 1 wherein said kernel events are network kernel events.

14. The system of claim 13 wherein said network kernel events are TCP/IP network kernel events comprising one of:
    a) connection establishment (TCP/IP SYN packet arrival);
    b) disconnection (TCP/IP FIN packet arrival);
    c) TCP/IP data packet arrival.

15. The system in claim 13 wherein said network kernel events are UDP/IP kernel events.

16. The system of claim 13, further comprising: one or more extension architecture handlers, wherein said supplied handler routines are indirectly coupled to said network kernel events via said one or more extension architecture handlers which execute said supplied handler routines; said one or more extension architecture handlers are executed based on method to derive response; said one or more extension architecture handlers including one of: a DeriveCachedResponse handler wherein a network server response is derivable from cached non-paged memory; a DeriveUncachedResponse handler wherein a network server response is derivable from persistent media local to a computer running a network server; a DeriveRemoteResponse handler wherein a network server response is derivable from additional network communication; and a defer to user space kernel extension component handler wherein a network server response is derivable from a user space class specific application component.

17. The system of claim 14 wherein said extension architecture is a network extension architecture which reuses TCP/IP connection endpoints after these connection endpoints are disconnected, wherein said connection endpoints are data structures associated with individual TCP/IP connections in a TCP/IP implementation native to an operating system.

18. The system of claim 1 wherein the extension architecture is a network server extension architecture, said network server extension architecture comprising one or more of: a connection endpoint management means for allocating and garbage collecting data structures associated with a network transport layer connection endpoints; a request management logic means for managing request fragments on behalf of said supplied handler routines; a cache management logic for deriving responses from non-paged memory; and a thread management logic means for deriving responses on high latency requests.

19. The system of claim 18 where said network server extension architecture derives responses based on cached information.

20. The system of claim 19 where said cached information is derived by prefetching future responses based on data from previous requests.

21. The system in claim 19 wherein said network server extension architecture derives responses based on file data.

22. The system in claim 21 where file data is cached in kernel memory separate from the file system cache.

23. The system in claim 21 where the file data is obtained from the file system cache using file system interfaces within the kernel environment.

24. The system in claim 23 where access to file data in file system cache is facilitated using cached file handles to copy data from cache to distinct kernel memory.

25. The system in claim 23 where access to file data in file system cache is facilitated using cached file handles and kernel interfaces to access cached pageable file data associated with said file handles without copying file data.

26. The system in claim 23 where access to file data in file system cache is facilitated using cached file handles and kernel interfaces pin and unpin cached file system memory.

27. The system in claim 1 wherein the portability architecture is a network server portability architecture comprising generic interfaces to the native operating system environment for one or more of:

a) exposing network kernel events;

b) accessing the file system cache;

c) managing operating system file handles; and d) managing operating system threads.

28. The system in claim 27 wherein said network kernel events are TCP/IP network kernel events.

29. The system in claim 27 wherein said network kernel events are UDP/IP network kernel events.

* * * * *